United States Patent
Lin (10) Patent No.: US 8,851,388 B2
(45) Date of Patent: Oct. 7, 2014

(54) RFID (RADIO FREQUENCY IDENTIFICATION) TAG

(76) Inventor: Chin Hua Lin, Taoyuan County (TW)

( * ) Notice: Subject to any disclaimer, the term of this patent is extended or adjusted under 35 U.S.C. 154(b) by 206 days.

(21) Appl. No.: 13/466,379

(22) Filed: May 8, 2012

(65) Prior Publication Data

US 2012/0217310 A1     Aug. 30, 2012

Related U.S. Application Data

(63) Continuation-in-part of application No. 13/097,319, filed on Apr. 29, 2011, now abandoned.

(30) Foreign Application Priority Data

Jul. 6, 2010  (TW) .............................. 99122106 A (51) Int. Cl.
G06K 19/06     (2006.01)
G06K 19/077    (2006.01)

(52) U.S. Cl.
CPC .... G06K 19/07771 (2013.01); G06K 19/07794 (2013.01)
USPC ......................................... 235/492; 235/451

(58) Field of Classification Search
USPC .......................................... 235/492, 451, 487
See application file for complete search history.

(56) References Cited

U.S. PATENT DOCUMENTS

| | | | |
|---|---|---|---|
| 6,407,710 B2 * | 6/2002 | Keilen et al. .................. | 343/702 |
| 7,688,276 B2 * | 3/2010 | Quintero Illera et al. ..... | 343/846 |
| 2002/0149523 A1 * | 10/2002 | Fang et al. .................... | 343/702 |
| 2006/0145927 A1 * | 7/2006 | Choi et al. ............. | 343/700 MS |
| 2010/0181379 A1 * | 7/2010 | Okegawa et al. ............. | 235/488 |
| 2010/0230498 A1 * | 9/2010 | Atherton ....................... | 235/492 |

* cited by examiner

*Primary Examiner* — Ahshik Kim
(74) *Attorney, Agent, or Firm* — Rosenberg, Klein & Lee (57) ABSTRACT

An RFID (Radio Frequency Identification) tag includes a grounding casing, an coupling casing disposed opposite to the grounding casing and an RFID module. The coupling casing includes a coupling part cooperating with the grounding casing to define a coupling space there-between. The RFID module is disposed in the coupling space and includes an RFID chip and a coupling member coupled electrically to the RFID chip such that upon receipt of one of the driving signal and the identification signal, surface current is generated on an upper surface of the RFID tag, which, in turn, induces a resonant electromagnetic energy within the coupling space, thereby increasing a detecting strength of the RFID module relative to the one of the driving signal and the identification signal.

15 Claims, 14 Drawing Sheets

RFID (RADIO FREQUENCY IDENTIFICATION) TAG

CROSS-REFERENCE TO RELATED APPLICATION

This application is a Continuation-in-Part of U.S. patent application Ser. No. 13/097,319, which was filed on Apr. 29, 2011, and is currently pending.

BACKGROUND OF THE INVENTION

1. Field of the Invention

The present invention relates to an RFID (Radio Frequency Identification) tag, and more particularly, relates to an RFID tag including an electric or magnetic field coupling casing.

2. Description of the Prior Art

The technology of radio frequency identification (hereafter: RFID), also called electronic tag, is a communications technology for identifying a certain target and reading/writing related data via radio signal. One of the advantages of the technology of RFID is that targets are identifiable without mechanical or optical contacts.

The technology of RFID includes two parts: one is an RFID reader and the other is an RFID tag. The RFID reader is for transmitting electromagnetic wave signals to the RFID tag; an identification wave reflects or transmits from the tag, and the identification signal is sent back to the RFID reader.

There are three types of RFID tags depending on whether a power supply is built in: active RFID tags, semi-active RFID tags and passive RFID tags. Among them, passive RFID tags are not built in with a power supply and the circuit inside can only be driven via the received energy of electromagnetic wave outside. Once the passive RFID tag receives enough intensity of signals, it backscatters an identification signal to the RFID reader.

Since a passive RFID tag is not built in any battery power, it has advantages such as lower price and smaller size; therefore, it is the most widely used in the market in terms of electronic toll collection, warehouse management, logistics management, locating objects out of sight, etc.

Moreover, RFID tags are also categorized in four types according to their working frequency low frequency (LF) tags, high frequency (HF) tags, ultrahigh frequency (UHF) tags and microwave (MW) tags, wherein UHF refers to working frequency ranging from 860 MHz to 960 MHz. The higher the working frequency is, the higher the transmission rate of signals is. As a result, UHF tags win people's attention mostly and are mainly used in fields of logistics and objects locator.

However, passive RFID tags in the prior art are planar RFID tags on the basis of dipole antennas; gain of its receiving and transmitting signals is too low and is affected easily by the environment.

Besides, a UHF RFID tag is very sensitive to metal or liquid surroundings due to its characteristic of backscatter of electromagnetic wave. When the UHF RFID tag is applied on surfaces of metal, liquid or earth, the electromagnetic wave will be highly and seriously interfered or will be absorbed. The phenomena may cause the RFID chip lacks of power to get driven. Even there is enough power to drive the chip, the same phenomena may have not enough power backscatter to the reader.

One way to resolve the issue mentioned above is to separate the RFID tag from the surface of metal at an appropriate distance, or add an absorber layer on the back of the RFID tag to decrease the interference in the RFID tag caused by the metal objects. As a result, the RFID tag can only be read from its front side. Hence, the conventional way can not satisfy the market needs and can not really solve the problem.

Another way is applying a ceramic substrate with a micro-stripe antenna. The size of an RFID tag is shrunk because of high dielectric constant of ceramics. However, since the quality factor as its central frequency divided to bandwidth of this conventional RFID tag is very high, the RFID tag usually can only be applied in a range of narrow-bandwidth. Moreover, this antenna requires matching circuit between micro-strip line and chip in order to obtain the optimum effects. The matching circuit is easily affected by the ambient objects, such as metal so that the conventional RFID tag does not satisfy the market needs.

In addition, the environments for storing and managing materials or products are usually in great demand; i.e., steel bars are stacked disorderly; gas bottles of different sizes are stored together and etc. Obviously, the electromagnetic wave signals for reading the RFID tags are mostly interfered, reflected and absorbed, and the RFID tags are also likely to be damaged, which make it difficult to read the RFID tags.

SUMMARY OF THE INVENTION

Therefore, the main object of the present invention is to provide an RFID tag including an electric or magnetic field coupling casing, which cooperates with a grounding casing to induce a resonant electromagnetic field there-between so as to enhance the signal strength of electromagnetic wave signals.

The RFID tag is provided according to the present invention for receiving a driving signal and backscattering an identification signal to an RFID reader in response to the driving signal. The RFID tag of the present invention includes a grounding casing, an electric or magnetic field coupling casing (hereinafter: coupling casing) and an RFID module. The grounding casing and the coupling casing respectively are made from a conductive material and an open circuit state is formed there-around. Alternately, a shorter circuit state can be formed only between one end of the electric field coupling casing and the grounding casing.

In one embodiment of the present invention, the grounding casing is a metal plate. The coupling casing is installed opposite to the grounding casing and includes a coupling part, which cooperates with the grounding casing to define a coupling space therebetween, and a covering part extending laterally and integrally from the coupling part in order to induce a resonant electromagnetic field in the coupling space, wherein when the coupling casing and the grounding casing define an open circuit there-around, the length of the coupling casing is a half wavelength of the electromagnetic wave. When one end of the electric field coupling casing is connected electrically to the grounding casing as a short circuit, the length of the coupling casing is a quarter wavelength of the electromagnetic wave.

The RFID (Radio Frequency Identification) module is installed within the coupling space defined between the coupling part and the grounding casing. The RFID module includes an RFID (Radio Frequency Identification) chip and a coupling member coupled electrically to the RFID chip for reception of the driving signal and transmission of the identification signal. Upon receiving the wave of the driving signal and the identification signal, surface current is generated on an upper surface of the RFID tag, which, in turn, induces a resonant electromagnetic field within the coupling space, thereby enhancing the detecting strength of the RFID (Radio Frequency Identification) module relative to the one of the driving signal and the identification signal.

Preferably, when the surface current is generated on the upper surface of the RFID tag, the coupling part is the region where a maximum voltage difference is defined between the coupling casing and the grounding casing so that the coupling space stands a time varied electric field. In addition, the coupling member of the RFID module further includes an inductor connected electrically to the RFID chip in parallel manner relative to each other in order to extract the resonant electromagnetic energy within the coupling space.

Preferably, when the surface current generated on an upper surface of the coupling casing, the coupling part is the maximum current region where a time varied magnetic field exists in the coupling space. The coupling member of the RFID module further includes a capacitor connected electrically to the RFID chip in parallel manner relative to each other in order to extract the resonant electromagnetic energy within the coupling space. In this embodiment, the capacitor is a plate capacitor.

In one embodiment of the present invention, the covering part of the coupling casing is connected electrically to the grounding casing via a plurality of wires. In another embodiment of the present invention, the RFID tag further includes an insulating case installed between the coupling casing and the grounding casing. Preferably, the insulating case includes a plastic material, which prevents the problem that the enhanced electric field can not be generated due to electric conductance caused by objects contacting the coupling part and the grounding casing once the objects are stacked over one another and thus prevents the reading ability of the RFID tag from being affected.

When compared with the conventional RFID tag with additional layers to absorb reflecting wave or the conventional ceramic capacitor with micro-stripe antennas, the RFID tag of the present invention increases the signal strength of the driving signal or the identification signal by providing the coupling casing for inducing and generating the resonant electromagnetic field between the coupling casing and the grounding casing once the wave of the driving signal or the identification signal is received. As a result, the RFID tag of the present invention provides a larger reading range; in embodiments such as the RFID tag is applied in stacked metal objects, it remains readable even when only few driving signal or identification signal are received. Besides, since the thickness of the coupling casing does not affect the generation of the resonant electromagnetic field, nor the reading ability of the RFID tag, the RFID tag of the present invention can be reinforced by adding the thickness of the coupling casing so that the RFID tag has better crashworthiness.

BRIEF DESCRIPTION OF THE DRAWINGS

Other features and advantages of this invention will become more apparent in the following detailed description of the preferred embodiments of this invention, with reference to the accompanying drawings, in which.

DETAILED DESCRIPTION OF THE PREFERRED EMBODIMENTS

The present invention relates to an RFID (Radio Frequency Identification) tag, and more particularly, relates to an RFID tag including an electric or magnetic field coupling casing. Preferred embodiments of the present invention are disclosed in the following paragraphs for better understanding of the present invention. However, the scope of the present invention should not be limited only to the structure of the disclosed embodiments.

Figure 1:
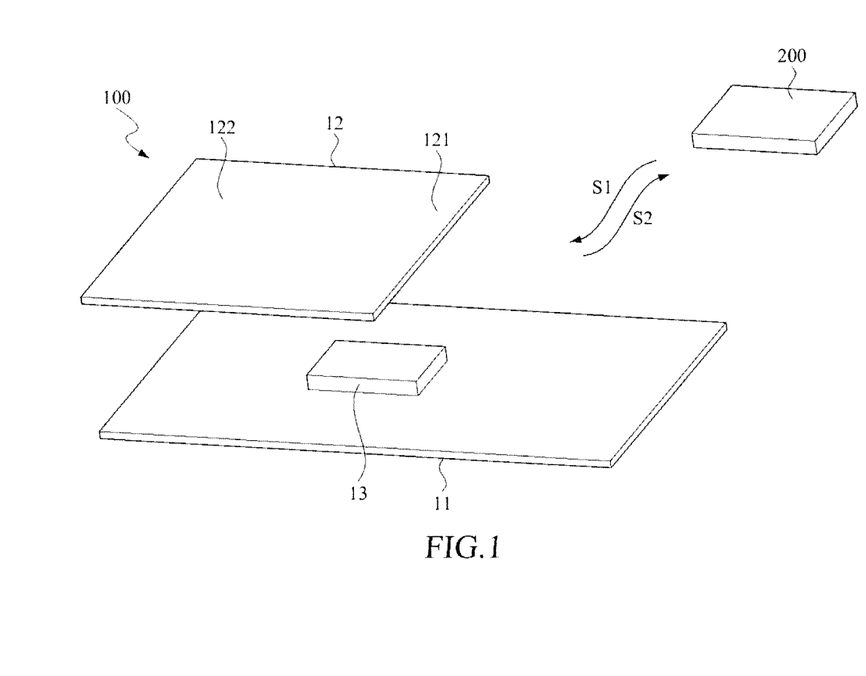
FIG. 1 is a perspective view of the first embodiment of an RFID tag according to the present invention.
Figure 1A:
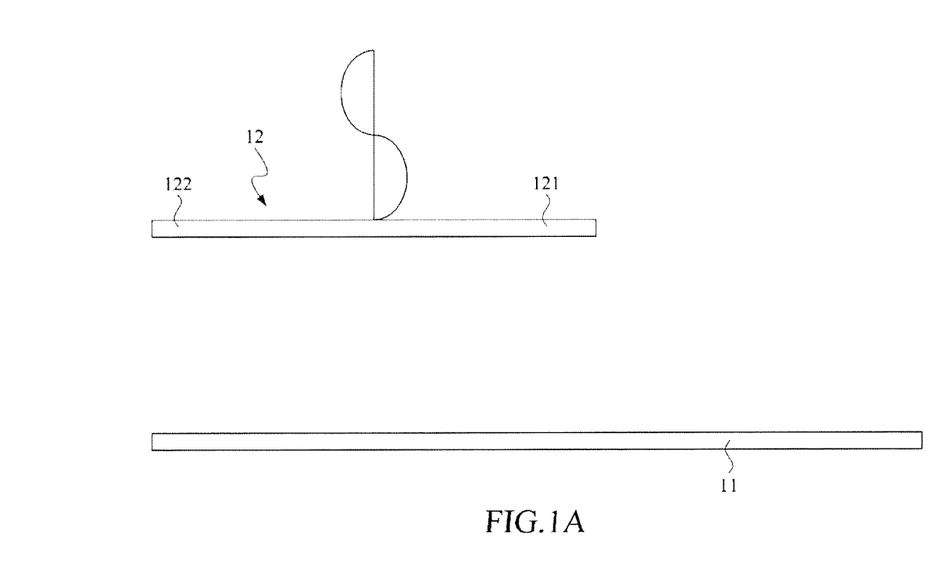
FIG. 1A is a lateral side view of the first embodiment of the RFID tag according to the present invention.
Figure 3:
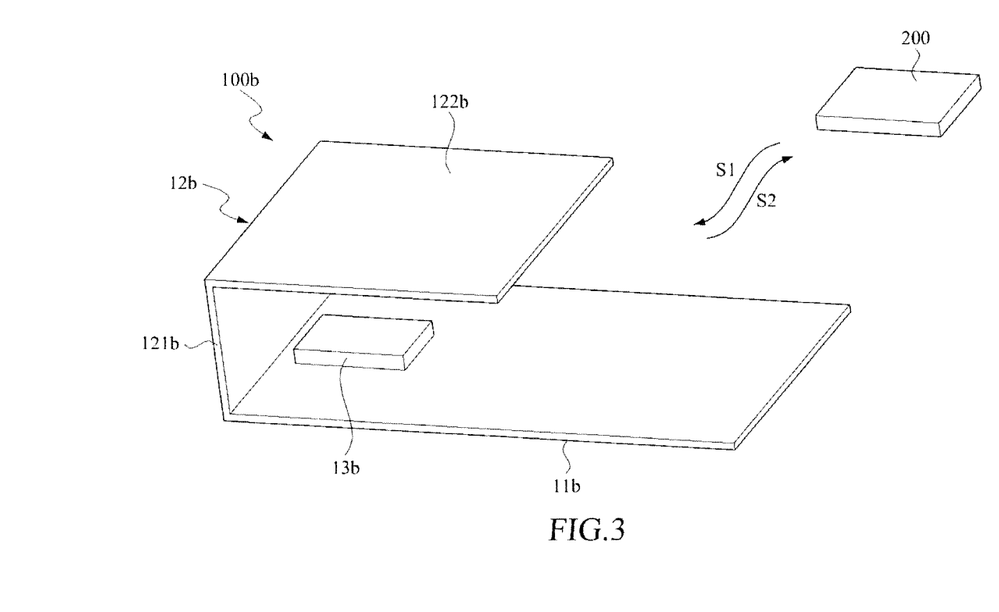
FIG. 3 is a perspective view of the third embodiment of the RFID tag according to the present invention.
Figure 4:
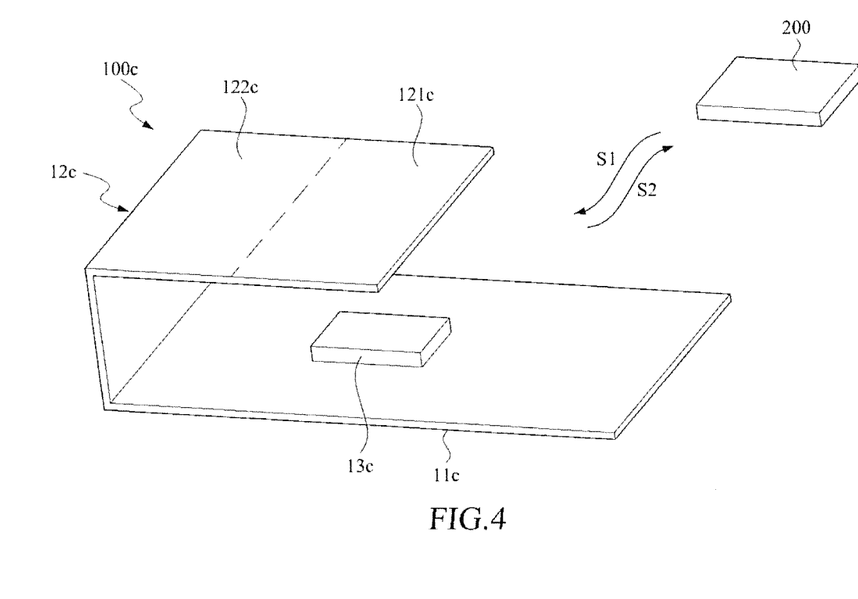
FIG. 4 is a perspective view of the fourth embodiment of the RFID tag according to the present invention.
Figure 5:
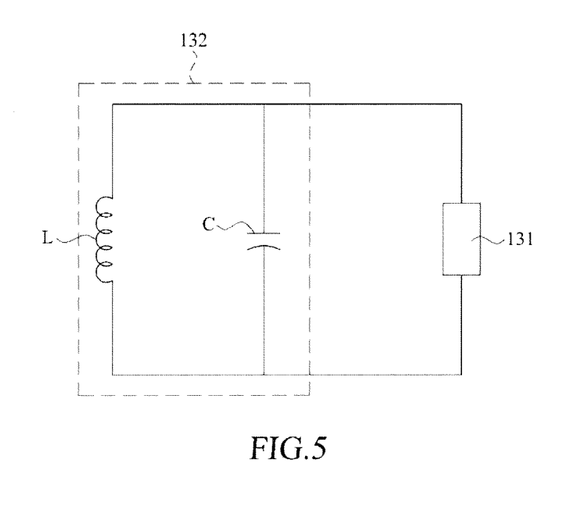
FIG. 5 is a circuit diagram of an RFID (Radio Frequency Identification) module employed in the RFID tag according to the present invention.

Referring to FIGS. 1~5, wherein FIG. 1 is a perspective view of the first embodiment of an RFID tag according to the present invention; FIG. 1A is a lateral side view of the first embodiment of the RFID tag according to the present invention while FIG. 5 is a circuit diagram of an RFID (Radio Frequency Identification) module employed in the RFID tag according to the present invention. The RFID tag 100 is used for receiving the driving wave with a command signal S1 and backscattering the wave carrying an identification signal S2 to an RFID reader 200. The RFID tag 100 accordingly includes a grounding casing 11, an electric field or magnetic field coupling casing 12 (hereinafter coupling casing) and an RFID module 13.

The grounding casing 11 is made from a conductive material and can be installed on an external surface of a metal product or other objects providing ground connections. In this embodiment, the grounding casing 11 is a metal plate. The coupling casing 12 is also made from a conductive material, is installed opposite to the grounding casing 11 and includes, due to size restriction, a coupling part 121 and a covering part 122, wherein the coupling part 121 cooperates with the grounding casing 11, there-between to define a coupling space standing a time varied electric field. The covering part 122 extends laterally and integrally from one side of the coupling part 121. The coupling casing 12 will generate a resonant electromagnetic field or energy as the current flowing length is a half wavelength long.

The RFID module 13 is installed within the coupling space defined between the grounding casing 11 and the coupling casing 12. The RFID module 13 includes an RFID (Radio Frequency Identification) chip 131 and a coupling member 132. The coupling member 132 is connected electrically to the RFID chip 131 for receiving the driving signal S1 and sending the identification signal S2. The coupling member 132 of the RFID module 13 further includes an inductor L and a capacitor C, which are connected to the RFID chip 131 in parallel manner.

In this embodiment, the capacitor C is a plate capacitor while the inductor L is fabricated as a return circuit so that the capacitor C or the inductor L of the RFID module 13 extracts the electromagnetic energy and then transfers it to the RFID chip 131.

To be more specific, upon receiving the electromagnetic wave of the driving signal S1 and the continuous wave of identification signal S2, a surface current is generated on an upper surface of the RFID tag 100 (not visible), which, in turn, induces a resonant electromagnetic field or energy within the coupling space, thereby increasing the detecting strength of the RFID (Radio Frequency Identification) module 13. When the negative and positive charges are collectively located at opposite ends of the electric field coupling casing 12 (i.e., when the surface current is generated on the upper surface of the RFID tag 100), a maximum voltage difference is defined between the coupling casing 12 and the grounding casing 11 at both ends.

On the other hands, the RFID module 13 can be installed within the coupling space proximate to the other end of the coupling casing 12. Note that the location of the RFID module 13 is not restricted to this embodiment only. The RFID module 13 can be disposed proximate to two opposite ends of the coupling casing 12 and the detecting strength of the same relative to the signal is not affected.

Figure 2:
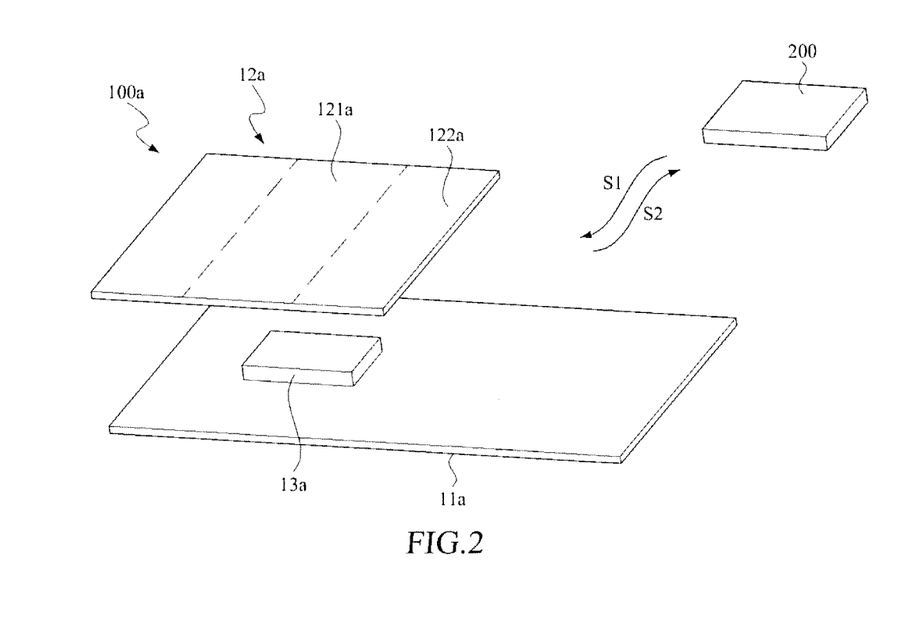
FIG. 2 is a perspective view of the second embodiment of the RFID tag according to the present invention.
Figure 2A:
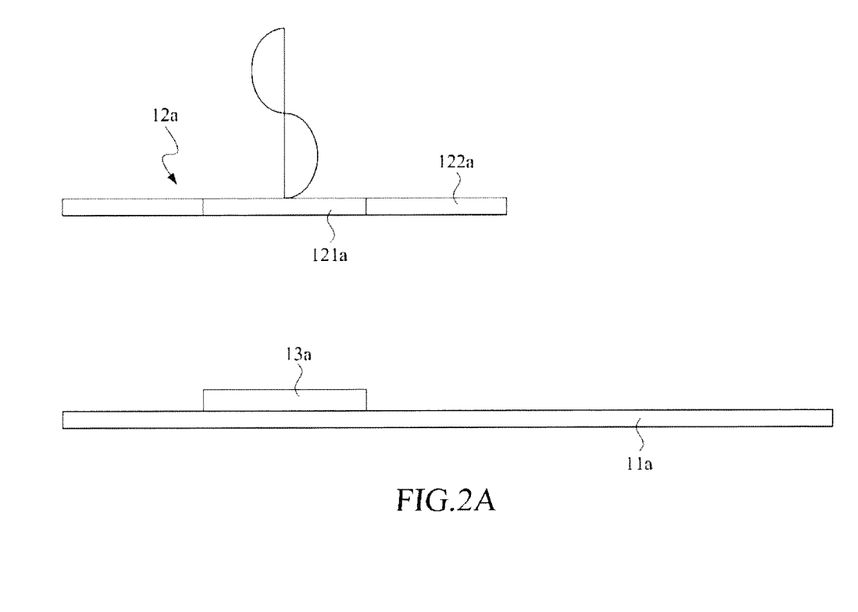
FIG. 2A is a lateral side view of the second embodiment of the RFID tag according to the present invention.

Referring to FIGS. 2, 2A~5, wherein FIG. 2 is a perspective view of the second embodiment of the RFID tag according to the present invention while FIG. 2A is a lateral side view of the second embodiment of the RFID tag according to the present invention. The difference of this embodiment relative to the former ones resides in that the coupling part 121a is a maximum current region, and the RFID module 13a is installed at a time varied magnetic field position corresponding to the coupling part 121a. The RFID module 13a further includes an RFID (Radio Frequency Identification) chip 131 and a coupling member 132 coupled electrically to the RFID chip 131 for reception of the driving signal S1 and transmission of the identification signal S2.

Upon receipt of one of the driving signal S1 and the identification signal S2, a surface current is generated on an upper surface of the RFID tag 100a (not visible), which, in turn, induces a resonant electromagnetic field within the coupling space so that the central portion of the coupling casing 12 has the maximum current flow, thereby increasing a detecting strength of the capacitor of the RFID (Radio Frequency Identification) module 13a relative to the one of the driving signal S1 and the identification signal S2.

Figure 3A:
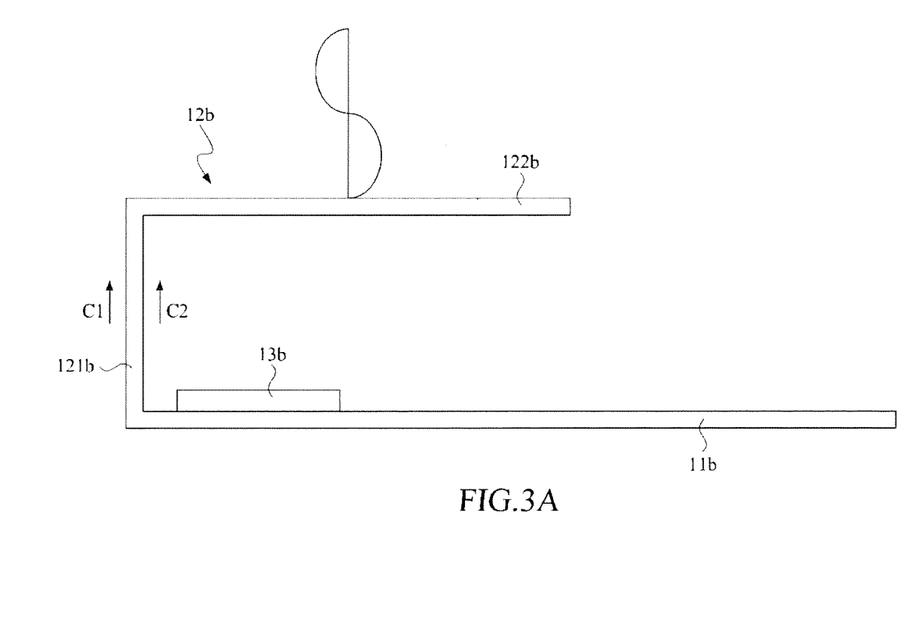
FIG. 3A is a lateral side view of the third embodiment of the RFID tag according to the present invention.

Referring to FIGS. 3, 3A~5, wherein FIG. 3 is a perspective view of the third embodiment of the RFID tag according to the present invention while FIG. 3A is a lateral side view of the third embodiment of the RFID tag according to the present invention. The difference of this embodiment relative to FIGS. 1 and 2 resides in that the resonant length of the coupling casing 12b has a quarter wavelength and the coupling casing 12b is disposed opposite to the grounding casing 11b, which has one end connected electrically to the grounding casing 11b as a short circuit. Under this condition, the coupling part 121b will be a region of maximum current and the RFID module 13b is installed at a time varied magnetic field position corresponding to the coupling part 121b. The RFID module 13b further includes an RFID (Radio Frequency Identification) chip 131 and a coupling member 132 coupled electrically to the RFID chip 131 for reception of the driving signal S1 and transmission of the identification signal S2.

Upon receipt of one of the driving signal S1 and the identification signal S2, a surface current is generated on an upper surface of the RFID tag 100b (not visible), which, in turn, induces a resonant electromagnetic field within the coupling space so that the surface current on the outer surface of the coupling casing 12 flows through the inner surface of the coupling casing to grounding casing 11b with the same phase at 121b (FIG. 3 shows two different current flows C1, C2) so that a maximum current region is defined between the coupling casing 12 and the grounding casing 11, which, in turn, increases a detecting strength of the capacitor of the RFID (Radio Frequency Identification) module 13b relative to the one of the driving signal S1 and the identification signal S2.

Figure 4A:
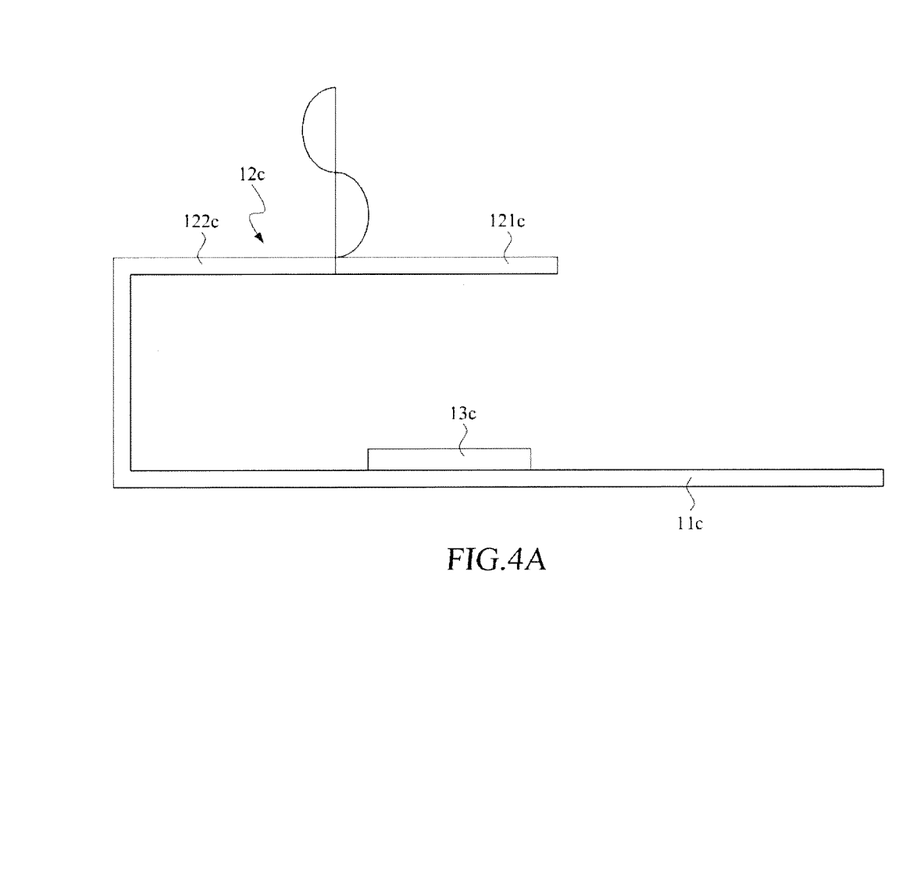
FIG. 4A is a lateral side view of the fourth embodiment of the RFID tag according to the present invention.

Referring to FIGS. 4, 4A~5, wherein FIG. 4 is a perspective view of the fourth embodiment of the RFID tag according to the present invention while FIG. 4A is a lateral side view of the fourth embodiment of the RFID tag according to the present invention. The difference of this embodiment relative to FIGS. 3 and 3A resides in that the coupling part 121c has maximum voltage difference relative to the grounding casing while the RFID module 13c is installed at a time varied electric field position corresponding to the coupling part 121c. The RFID module 13c further includes an RFID (Radio Frequency Identification) chip 131 and a coupling member 132 coupled electrically to the RFID chip 131 for reception of the driving signal S1 and transmission of the identification signal S2.

Upon receipt of one of the driving signal S1 and the identification signal S2, a surface current is generated on an upper surface of the RFID tag 100c (not visible), which, in turn, induces a resonant electromagnetic field within the coupling space. A maximum voltage difference is defined between the open end of the coupling casing 12c and the grounding casing 11c so that a time varied electric field region is defined therebetween, which, in turn, increases the detecting strength of the inductor L of the coupling member 132 as the RFID module installed over there.

Figure 6:
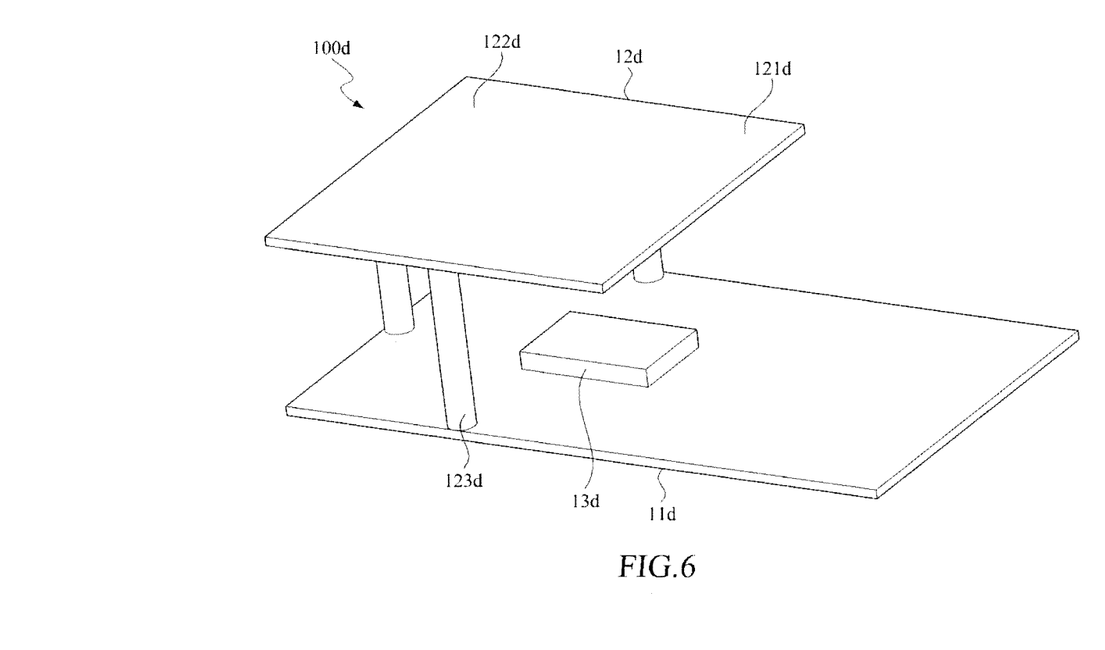
FIG. 6 is a perspective view of the fifth embodiment of the RFID tag according to the present invention.
Figure 7:
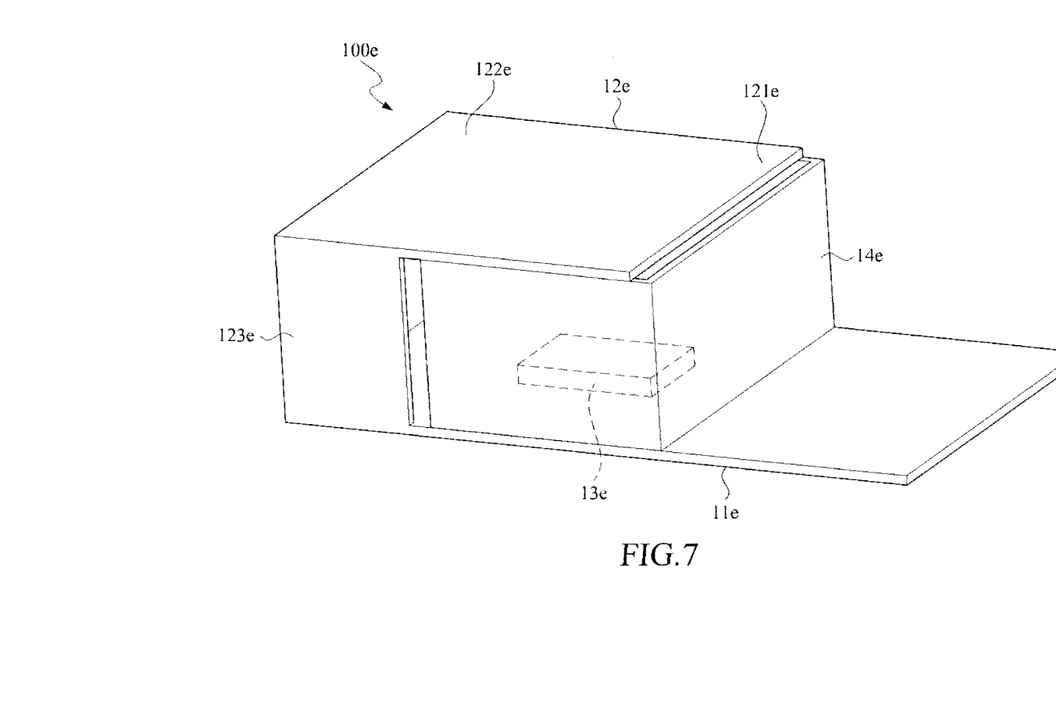
FIG. 7 is a perspective view of the sixth embodiment of the RFID tag according to the present invention.

Referring to FIGS. 6 and 7, wherein FIG. 6 is a perspective view of the fifth embodiment of the RFID tag according to the present invention while FIG. 7 is a perspective view of the sixth embodiment of the RFID tag according to the present invention. The only difference of this embodiment relative to FIGS. 1 and 5 resides in that the coupling casing 12d is connected electrically to the grounding casing 11d via a plurality of wires 123d. An important factor to note is that the covering part 122d needs to be extended laterally and integrally from the coupling part 121d, the greater length and area of the coupling part 122d extends from the coupling part 121d, the stronger the detecting ability of the RFID (Radio Frequency Identification) module 13d becomes relative to one of the driving signal S1 and the identification signal S2.

As illustrated in FIG. 7, the RFID tag 100e of the present invention further includes an insulating case 14e. The insulating case 14e is installed between the coupling casing 12e and the grounding casing 11e. Preferably, the insulating case 14e includes a plastic material, which prevents the problem that the enhanced electric field can not be generated due to electric conductance caused by objects contacting the coupling part 121e and the grounding casing 11e once the objects are stacked over one another and thus prevents the reading ability of the RFID tag 100e from being affected.

Figure 8:
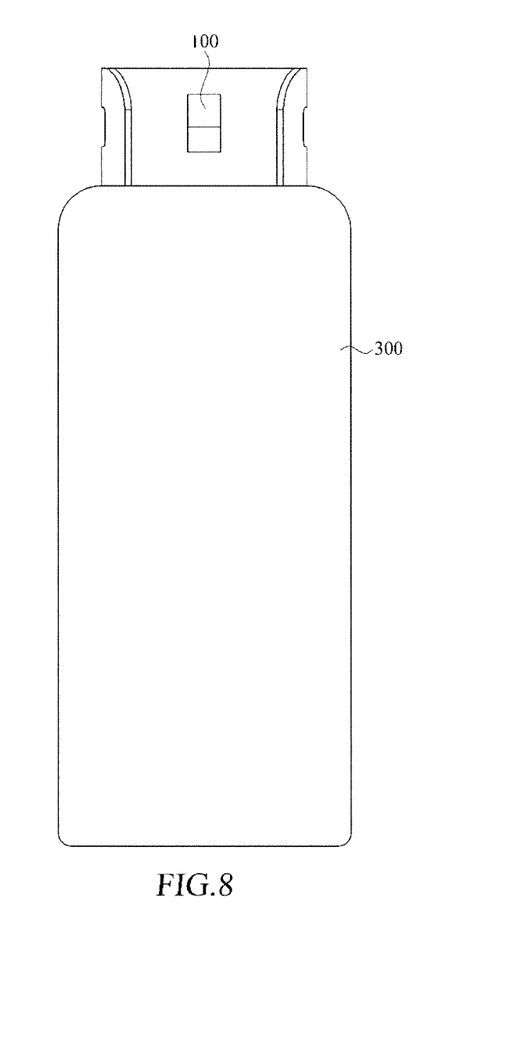
FIG. 8 shows the RFID tag according to the present invention attached on a gas bottle.
Figure 9:
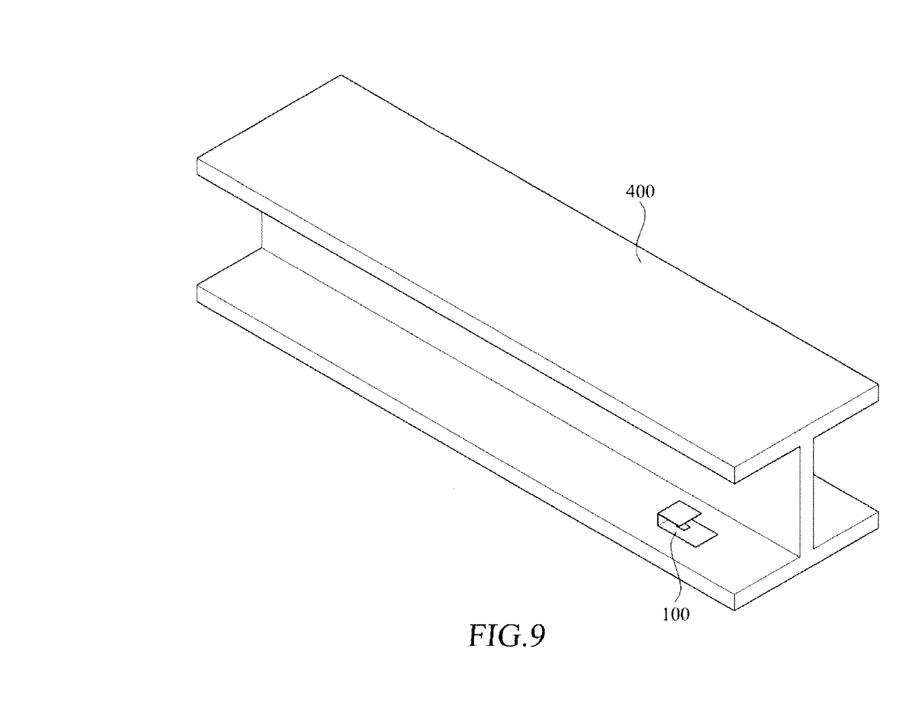
FIG. 9 shows the RFID tag according to the present invention attached on an H-shaped steel bar.

Since the RFID module 13 of the RFID tag 100 of the present invention is installed between the coupling casing 12 and the grounding casing 11, the RFID module 13 is well protected. In practice, the RFID tag 100 can be installed in any places of the objects. Referring to FIGS. 8 and 9, wherein FIG. 8 shows the RFID tag 100 of the present invention disposed on a gas bottle while FIG. 9 shows the RFID tag 100 of the present invention disposed on an H-shaped steel bar 400. Most materials or products in the market, such as gas bottles 300 or H-shaped steel bars 400, need to be organized and managed according to their life time. Although the conventional RFID tag with additional layers for collecting waves or the conventional ceramic capacitor with micro-stripe antennas can be used for managing and detecting the mentioned materials and products, the conventional technology can only check them one by one. However, if the materials or products are stacked together, the electromagnetic waves will become weak for being reflected or absorbed; further, the conventional technology can only read the materials or products from their front side, which makes management difficult. On the contrary, the RFID tag 100 according to the present invention can read materials or products such as the gas bottle 300 or the H-shaped steel bar 400 not only from their front side. When materials or products are stacked over one another, as long as the electromagnetic wave signal reflects and reaches the RFID tag 100, the resonant electromagnetic field is generated between the coupling part 121 and the grounding casing 11 so as to enhance the signal strength for the RFID module 13 to read.

Figure 10:
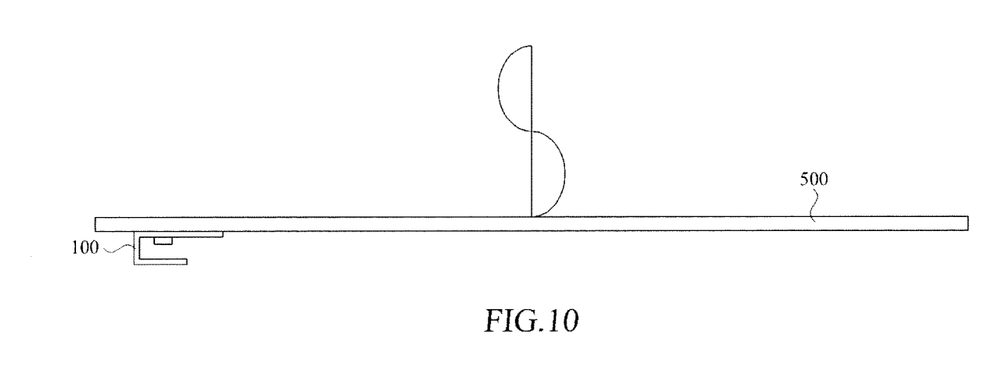
FIG. 10 shows the RFID tag according to the present invention receiving a radio signal from a back side thereof.

Referring to FIG. 10, wherein FIG. 10 shows the RFID tag 100 according to the present invention receiving a radio signal from a back side thereof. As illustrated, the RFID tag 100 of the present invention is disposed on a back side of a metal product 500 (or disposed within the metal product). The metal product 500 can be a manhole cover, suspension stand or an engine shield. Upon receipt of one of the driving signal S1 and the identification signal S2, the surface current will be generated on the metal object and few leakage current flows to back will be collected by the RFID tag 100. A resonant electromagnetic field is induced, thereby enhancing the detecting ability of the RFID module 13 to read.

In conclusion, when compared with the conventional RFID tag with additional absorber layers to absorb reflecting wave from metal objects or the conventional ceramic capacitor with micro-stripe antennas, the RFID tag 100 of the present invention increases the signal strength of the driving signal S1 or the identification signal S2 by providing the coupling casing 12 for generating a resonant electromagnetic field between the coupling casing 12 and the grounding casing 11. As a result, the RFID tag 100 of the present invention provides a larger reading range; in embodiments such as the RFID tag 100 is applied in stacked metal objects, it remains readable even when only few driving signal S1 or identification signal S2 are received. Besides, since the thickness of the coupling casing 12 does not affect the generation of the electromagnetic field, nor the reading ability of the RFID tag 100, the RFID tag 100 can be reinforced by adding the thickness of the coupling casing 12 so that the RFID tag 100 has better crashworthiness.

While the invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. An RFID (Radio Frequency Identification) tag for receiving a driving signal and sending an identification signal to an RFID (Radio Frequency Identification) reader in response to the driving signal, the RFID tag comprising:
    a grounding casing made from a conductive material;
    a coupling casing made from the conductive material and disposed opposite to the grounding casing, the coupling casing including
        a coupling part cooperating with said grounding casing to define a coupling space there-between, and
        a covering part extending laterally and integrally from said coupling part; and
    an RFID (Radio Frequency Identification) module installed within said coupling space defined between said coupling part and said grounding casing, said RFID module including
        an RFID (Radio Frequency Identification) chip, and
        a coupling member coupled electrically to said RFID chip for reception of the driving signal and transmission of the identification signal;
    wherein, upon receipt of one of the driving signal and the identification signal, a surface current is generated on an upper surface of the RFID tag, which, in turn, induces a resonant electromagnetic field or energy within said coupling space, thereby increasing a detecting strength of said RFID (Radio Frequency Identification) module relative to said one of the driving signal and the identification signal; and
    wherein the length of an open circuit state of said coupling casing is a half wavelength.

2. The RFID tag according to claim 1, wherein said coupling part has the maximum voltage difference between said coupling casing and said grounding casing when said surface current is generated on said upper surface of the RFID tag then the coupling space stands a time varied electric field.

3. The RFID tag according to claim 2, wherein said coupling member of said RFID module further includes an inductor connected to the RFID chip in parallel manner relative to each other in order to extract said resonant electromagnetic energy within said coupling space.

4. The RFID tag according to claim 1, wherein said coupling part has the maximum current on the coupling casing when said surface current is generated on said upper surface of the RFID tag then the coupling space stands a time varied magnetic field.

5. The RFID tag according to claim 4, wherein said coupling member of said RFID module further includes a capacitor connected electrically to said RFID chip in parallel manner relative to each other in order to extract said resonant electromagnetic energy within said coupling space.

6. The RFID tag according to claim 5, wherein said capacitor is a plate capacitor.

7. An RFID (Radio Frequency Identification) tag for receiving a driving signal and sending an identification signal to an RFID (Radio Frequency Identification) reader in response to the driving signal, the RFID tag comprising:
    a grounding casing made from a conductive material;
    a coupling casing made from the conductive material and disposed opposite to the grounding casing, the coupling casing including
        a coupling part cooperating with said grounding casing to define a coupling space there-between, and
        a covering part extending laterally and integrally from said coupling part; and
    an RFID (Radio Frequency Identification) module including
        an RFID (Radio Frequency Identification) chip, and
        a coupling member coupled electrically to said RFID chip for reception of the driving signal and transmission of the identification signal;
    wherein, upon receipt of one of the driving signal and the identification signal, a surface current is generated on an upper surface of the RFID tag, which, in turn, induces a resonant electromagnetic field within said coupling space, thereby increasing a detecting strength of said RFID (Radio Frequency Identification) module relative to said one of the driving signal and the identification signal; and wherein the length of one end short circuit state of said coupling casing is a quarter wavelength.

8. The RFID tag according to claim 7, wherein said coupling part has the maximum voltage difference between said coupling casing and said grounding casing when said surface current is generated on said upper surface of the RFID tag then the coupling space stands a time varied electric field.

9. The RFID tag according to claim 8, wherein said coupling member of said RFID module further includes an inductor connected electrically to said the RFID chip in parallel manner relative to each other in order to extract said resonant electromagnetic energy within said coupling space.

10. The RFID tag according to claim 7, wherein said coupling part has the maximum current on the coupling casing when said surface current is generated on said upper surface of the RFID tag then the coupling space stands a time varied magnetic field.

11. The RFID tag according to claim 10, wherein said coupling member of said RFID module further includes a capacitor connected electrically to said RFID chip in parallel manner relative to each other in order to extract said resonant electromagnetic energy within said coupling space.

12. The RFID tag according to claim 11, wherein said capacitor is a plate capacitor.

13. The RFID tag according to claim 7, wherein said covering part is connected electrically to said grounding casing via a wire.

14. The RFID tag according to claim 7, further comprising an insulating case installed between the coupling casing and the grounding casing.

15. The RFID tag according to claim 14, wherein said insulating case is made from a plastic material.

\* \* \* \* \*